US008913065B2

(12) United States Patent
McCartney et al.

(10) Patent No.: US 8,913,065 B2
(45) Date of Patent: Dec. 16, 2014

(54) COMPUTER SYSTEM FOR ANIMATING 3D MODELS USING OFFSET TRANSFORMS

(76) Inventors: Jeffrey McCartney, Irvine, CA (US); Claus W. Jensen, Silkeborg (DK); Thomas Teger, Orange, CA (US); Brian Townsend, Irvine, CA (US); Henrik W Jensen, Solana Beach, CA (US)

( * ) Notice: Subject to any disclaimer, the term of this patent is extended or adjusted under 35 U.S.C. 154(b) by 460 days.

(21) Appl. No.: 13/284,412

(22) Filed: Oct. 28, 2011

(65) Prior Publication Data

US 2013/0033486 A1 Feb. 7, 2013

Related U.S. Application Data

(60) Provisional application No. 61/515,739, filed on Aug. 5, 2011.

(51) Int. Cl.
*G06T 13/00* (2011.01)
*G06T 15/00* (2011.01)
*G06T 13/20* (2011.01)

(52) U.S. Cl.
CPC ..................................... *G06T 13/20* (2013.01)
USPC .......................................... 345/473; 345/419

(58) Field of Classification Search
None
See application file for complete search history.

(56) References Cited

U.S. PATENT DOCUMENTS

| 6,628,286 | B1 * | 9/2003 | Comair et al. | 345/473 |
| 6,686,918 | B1 * | 2/2004 | Cajolet et al. | 345/473 |
| 7,084,875 | B2 * | 8/2006 | Plante | 345/473 |
| 7,515,155 | B2 * | 4/2009 | Anderson et al. | 345/473 |
| 7,990,398 | B2 * | 8/2011 | Pelletier et al. | 345/648 |
| 8,502,817 | B2 * | 8/2013 | Deb et al. | 345/419 |
| 8,610,743 | B2 * | 12/2013 | Poston et al. | 345/660 |
| 2004/0012641 | A1 * | 1/2004 | Gauthier | 345/848 |
| 2004/0169656 | A1 * | 9/2004 | Piponi et al. | 345/473 |
| 2009/0315894 | A1 * | 12/2009 | Goodwin | 345/473 |
| 2010/0123723 | A1 * | 5/2010 | Collard et al. | 345/473 |
| 2010/0134501 | A1 * | 6/2010 | Lowe et al. | 345/473 |

* cited by examiner

*Primary Examiner* — Ryan R Yang
(74) *Attorney, Agent, or Firm* — Mandour & Associates, APC

(57) ABSTRACT

The present invention relates to a novel 3D animation system for animating models. The system uses offset transforms to make it possible to make animation components that can be added individually to the animation system. The animation components simplify the process of animating 3D models performed conventionally. For example, the user can apply various animation components to the 3D object to make it move for a specific time, rather than the conventional process of specifying the precise position of a 3D object at specific frames.

20 Claims, 4 Drawing Sheets

COMPUTER SYSTEM FOR ANIMATING 3D MODELS USING OFFSET TRANSFORMS

CROSS REFERENCE TO RELATED APPLICATIONS

This application claims priority under 35 U.S.C. §119(e) to U.S. Provisional Application No. 61/515,739, filed Aug. 5, 2011, and entitled "Computer System for Animating 3D Models Using Offset Transforms," the disclosure of which is hereby incorporated by reference in its entirety.

BACKGROUND OF THE INVENTION

1. Field of Invention

The present invention relates generally to a method and apparatus for animating three-dimensional (3D) models and specifically to a 3D animation system using offset transforms.

2. Description of Related Art

Computer generated imagery includes the generation of static and dynamic moving images, where computer animation refers just to the dynamic moving images. Computer animation is a process used to generate animated moving images by using computer graphics. Modern computer animation usually uses 3D computer graphics, although 2D computer graphics are still used for stylistic, low bandwidth, and faster real-time renderings. Sometimes the end target for the computer animation is the computer itself, but other times the end target is another medium, such as a scene in a film.

To create the illusion of movement in 3D computer animation, along with television and films, an image is displayed on the computer screen and repeatedly replaced by a new image that is similar to the previous image, but advanced slightly in the time domain (e.g., at a rate of 24 or 30 frames/second). An example for how to move an object (e.g., a car) in 3D animation includes initially setting the screen's background to a color, such as black. Then, the car is drawn on the left of the screen. Next, the background is unchanged, but the car is duplicated slightly to the right of its original position. This process is repeated, each time moving the car a bit to the right. If this process is repeated fast enough, the car will appear to move smoothly to the right. This basic procedure is used for all moving pictures in films and television as well. Besides shifting an object, 3D animation can perform more complex transformations on the object, such as a change in size, shape, lighting effects, etc.

Conventional 3D computer animation uses keyframing. Keyframing is where specific attributes of a system are specified to occur at specific frames. In keyframing (e.g., programmed keyframed movement, keyframes, etc.), the user sets the position for an object at a given frame and then sets a new position for the object at another frame, and for all the intermediate frames, the system will move the object smoothly between the two positions.

A human animator or user can use keyframing to create animation data. Modeled objects can be constructed out of geometrical vertices, faces, and edges in a 3D coordinate system. The user can also use motion capture, either together with or separate from keyframing, to create animation data.

Designing animation using keyframes is one of the traditional challenges of 3D animation. Even for simple animations using keyframes, the setup and design is often very tedious and challenging, such that expert knowledge is required. Furthermore, keyframe-based animations are difficult to edit as well. Editing a keyframe-based animation requires that all of the control points of the animation curves associated with the system be modified.

U.S. Pat. No. 6,674,437 to Rose et al. is directed to a key reduction system which reduces the keyframes associated with a 3D movie to facilitate the streaming of the data over the Internet. As such, Rose's system facilitates the production, processing, and Internet distribution of 3D animated movies. Although the Rose's system reduces keyframes, Rose's system is still based on keyframes. Unfortunately, keyframe-based animation is quite complex to setup. It would be highly desirable to have an animation system that could create and edit animation without using keyframes, simply and based on time, independent of frame positioning.

SUMMARY OF THE INVENTION

Embodiments of the present invention relate to a novel 3D animation system for animating models. The system uses offset transforms to make it possible to make animation components that can be added individually to the animation system. The animation components, which can be based on the offset transforms, provide relative object movement based on previous object movements over time, instead of based on the position of the frames.

In one embodiment, a system comprises: a terminal; a three-dimensional model configured to be displayed on the terminal; an object in the three-dimensional model; and an animation component configured to be applied to the object to move the object or to change the look of the object, wherein the animation component has a start time and an end time defined in increments of time. The terminal may comprise a television or computer. The three-dimensional model may comprise a scene configured to be displayed on the terminal. The object may comprise an element in the scene. The animation component may comprise an offset transform.

The animation component may comprises a translation movement, a rotation movement, a scaling movement, a turntable movement, a camera orbit movement, a camera pan movement, a camera dolly movement, a camera zoom movement, a material parameter change, a lighting parameter change, or a time varying movement specified by a matrix at given time instances. The system may further comprise a timeline for adjusting the start time and the end time or may comprise interactive ray tracing. The three-dimensional model may be created and played back using the interactive ray tracing. The animation component and the object may be configured to be evaluated at a given time. The system may further comprise multiple animation components, wherein the animation components are organized hierarchically with animation components higher up in the hierarchy acting upon animation components lower in the hierarchy. The animation component may be configured to be hidden, deleted, copied and pasted to other objects, or changed by a user during playback of the three-dimensional model or while paused. The system may further comprise a library of animation components that can be added to the object.

In another embodiment, a method comprises the steps of: displaying a three-dimensional model on a terminal, wherein the three-dimensional model comprises an object; and applying an animation component to the object to move the object or to change the look of the object, wherein the animation component has a start time and an end time defined in increments of time. The three-dimensional model may comprise a scene configured to be displayed on a television or computer. The animation component may comprise an offset transform. The animation component may comprise a translation movement, a rotation movement, a scaling movement, a turntable movement, a camera orbit movement, a camera pan movement, a camera dolly movement, a camera zoom movement, a material parameter change, a lighting parameter change, or a time varying movement specified by a matrix at given time instances. The method may further comprise a timeline for adjusting the start time and the end time.

An advantage of the present invention is that it allows creating and editing 3D animation without the need for complicated keyframing. As a result, the user can move an object without having to specify the precise position where the object should move to. Also, the user can add various animation components to simultaneously move and/or change the look of the object. The creating and editing can be based on time, and not frame positioning. Animation components are used to simplify the conventional process of animating 3D models. This simpler method is easier to perform, and can be performed by people who are not computer animation experts.

The foregoing, and other features and advantages of the invention, will be apparent from the following, more particular description of the preferred embodiments of the invention, the accompanying drawings, and the claims.

DETAILED DESCRIPTION OF THE INVENTION

Before the present composition, methods, and methodologies are described, it is to be understood that this invention is not limited to particular compositions, methods, and experimental conditions described, as such compositions, methods, and conditions may vary. It is also to be understood that the terminology used herein is for purposes of describing particular embodiments only, and is not intended to be limiting, since the scope of the present invention will be limited only in the appended claims.

As used in this specification and the appended claims, the singular forms "a", "an", and "the" include plural references unless the context clearly dictates otherwise. Unless defined otherwise, all technical and scientific terms used herein have the same meaning as commonly understood by one of ordinary skill in the art to which this invention belongs. Any methods and materials similar or equivalent to those described herein can be used in the practice or testing of the invention, as it will be understood that modifications and variations are encompassed within the spirit and scope of the instant disclosure.

The present invention relates to a novel 3D animation system for animating models. The system uses offset transforms which make it possible to make animation components that can be added individually to the animation system. The animation components simplify the process of animating 3D models performed conventionally. For example, the user can apply various animation components to the 3D object to make it move for a specific time, rather than the conventional process of specifying the precise position of a 3D object at specific frames. Although the invention is sometimes illustrated and described in the context of 3D animations, one of ordinary skill in the art can apply these concepts in other dimensions (e.g., 2D, 4D, etc.)

Figure 1:
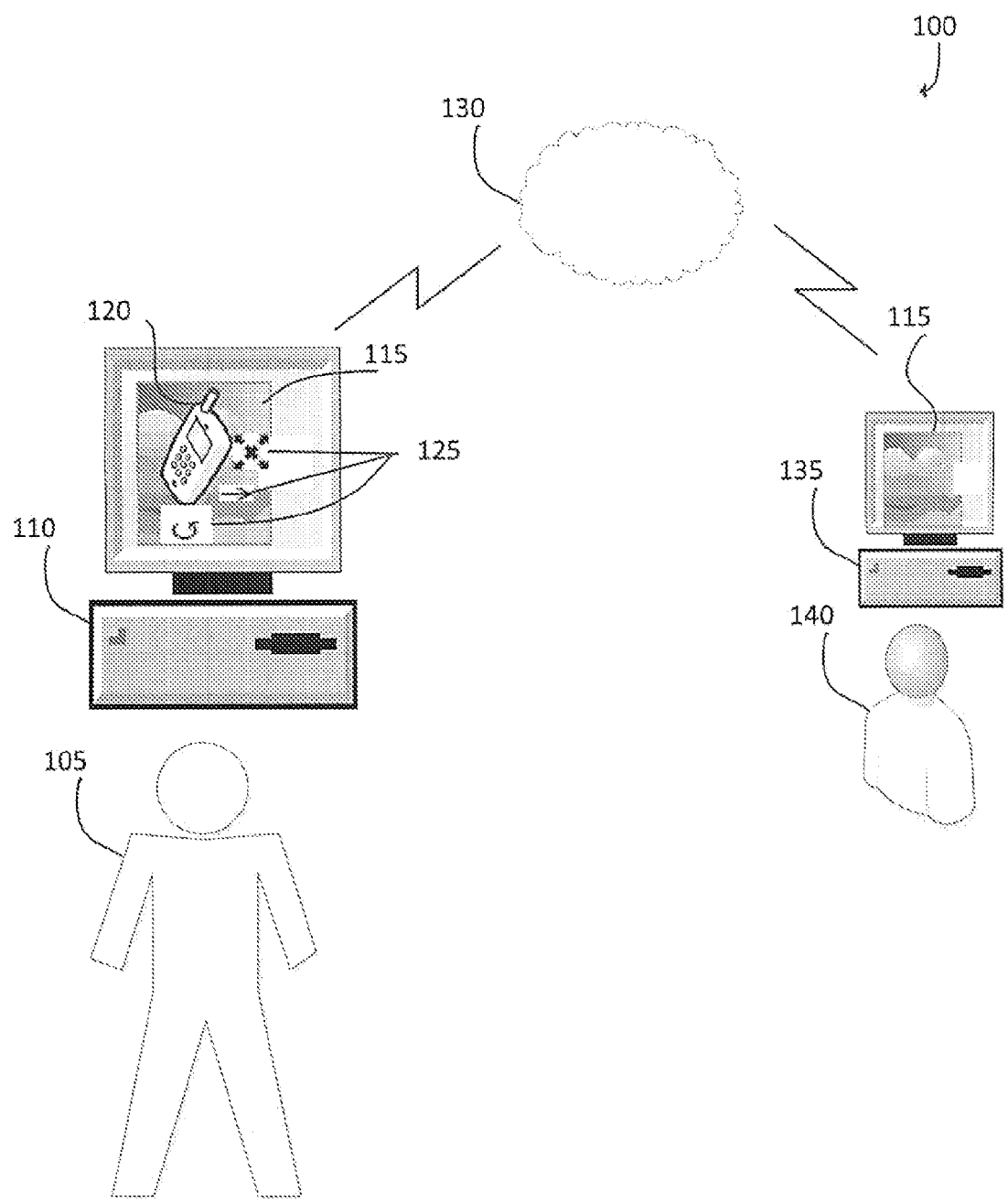
FIG. 1 illustrates a 3D animation system having animation components for moving objects according to one embodiment of the invention.

FIG. 1 illustrates a 3D animation system 100 having animation components 125 for moving one or more objects 120 according to one embodiment of the invention. The system 100 includes a user 105, a terminal 110, a 3D model 115, one or more objects 120, one or more animation components 125, a network 130, another terminal 135, and another user 140. The system 100 (e.g., interactive ray tracing system, ray tracing software program, etc.) uses the animation components 125 to move the objects 120 for a given period of time.

The user 105 can create, edit, watch, listen, or interact with the 3D model 115 on the terminal 110. The terminal 110 comprises a processor and memory. The processor can be used to create and edit the 3D model 115, and the memory can be used to store the 3D model 115. In one embodiment, the 3D model 115 is edited scene by scene. Although the terminal 110 is illustrated as a computer, it could instead be another electronic display device (e.g., a smartphone, a television, a MP3 player, etc.).

The 3D model 115 (e.g., 3D animation, scene, etc.) can be a previously created 3D model made by another user 140 on another terminal 135, or the 3D model 115 can be made from scratch by the user 105 on the terminal 110. The existing 3D model 115 can be imported into the terminal 110 from other computer-aided design (CAD) systems. Some CAD systems include SolidWorks, Autodesk Inventor, and PTC-Creo.

The 3D model 115 can include one or more objects 120. The objects 120 (e.g., 3D object, elements, geometric object, etc.) can be moved over any given start and end time. Alternatively, the movement can be viewed as having a start time and a duration time. Regardless, the position of the objects 120 can be viewed as changing over time, as opposed to changing over frames. The illustrated object 120 is a smartphone. However, the object 120 could be many other things, such as one or more pictures, products, merchandise, persons, or places.

The animation components 125 (e.g., animations) move and change the size, look, color, and/or shape of the object 120. Examples of animation components 125 include rotations, translations, scaling, turntables, camera orbits, camera dolly, camera zooms, material parameter changes, lighting changes, freeform transformations, etc.

Animation components can be created by the user 105 on the terminal 110, or can be imported from a library of existing 3D systems, such as the animations inside FBX formatted files. After the 3D model 115 is imported into the terminal 110, the animations components 125 are applied to the object 120 to affect the movement or look of the object 120. The animation components 125 are applied as offsets to the previous animation component 125 to ensure a consistent and smooth behavior of the animation system 100.

Each animation component 125 acts as an offset to the previous animation component 125, which makes it easy to combine multiple animation components 125 without knowing the precise frame position or orientation that results from the combined animation movement. Without needing to know the specific framing, creating and editing a 3D model 115 is much easier than conventional systems and can be performed by people who are not computer animation experts.

Multiple animation components 125 can be combined. This makes it possible to add multiple rotations, movements, and looks to a given object. For example the user 105 can add a first rotation to a given object for a given time and then later add a second rotation to the object for a separate or overlapping period of time. When the time is overlapping, the effect will be adding the first and second rotations together during the overlapped period of time. If the first and second rotations are the same, then the rotations will double the speed of the rotation of the object 120.

Mathematically, the movements of the animation components 125 can be described using a matrix that describes how to move a specific 3D element in a 3D model (e.g., scene). When multiple animation components 125 are added to the same 3D object, then the combined action of the matrices is computed by multiplying the individual matrices to obtain a combined animation, where each matrix builds upon the previous animation component 125 and uses the previous animation component 125 as the offset. Animation components 125 can be added, deleted, hidden, and modified individually while the system 100 is in use. The animation components 125 can also be copied and pasted, or moved onto other objects.

In one embodiment, the system 100 is a photorealistic real-time ray tracing system. In another embodiment, the system 100 is created using a software program without interactive ray tracing. The system 100 supports interactive playback of animations. Ray tracing is a computer graphics technique for generating an image by tracing the path of light through pixels in an image plane and simulating the effects of its encounters with virtual objects. Ray tracing provides a highly realistic view of the 3D object and allows the 3D model 115 to be visualized interactively. However, ray tracing has a large computational cost, making it better suited for applications where the image can be rendered slowly ahead of time, such as images, film, and television as oppose to real time applications like video games where speed is critical. The ray traced rendering is progressive and the quality improves the longer a given frame is viewed.

If the 3D model 115 has multiple objects 120, then the animation components 125 of the 3D model 115 can be organized hierarchically. In this situation, the animation components 125 can be applied to a group of 3D objects (e.g., parts) within the 3D model 115 (e.g., a scene). Each part may have its own unique set of animation components 125. The animation components 125 are combined hierarchically in order to move all the parts of the 3D model 115 precisely. An example could be a 3D car model, where the wheel parts rotate in a circle inside the model, while the entire car body is being translated (i.e., moved) in a straight line. The wheel will rotate and then move with the entire car body.

The user 105 can also combine animation components 125 into more complex animation components and save them into a library of new animation components. An example of a new animation component could be combining a translation movement and a rotation movement into a new animation component. This new animation component can be applied to the object 120 to make the object 120 both translate and rotate over a given period of time.

The network 130 (e.g., the Internet, a distribution platform, etc.) can provide the 3D animation 115 to the terminal 110. Alternatively, the 3D animation 115 can be created on the terminal 110 itself. Also, the network 130 connects the terminal 110 with another terminal 135, such that 3D models 115, objects 120, and animation components 125 can be distributed between the user 105 and another user 140. The network 130 can further comprise a series of servers.

Figure 2:
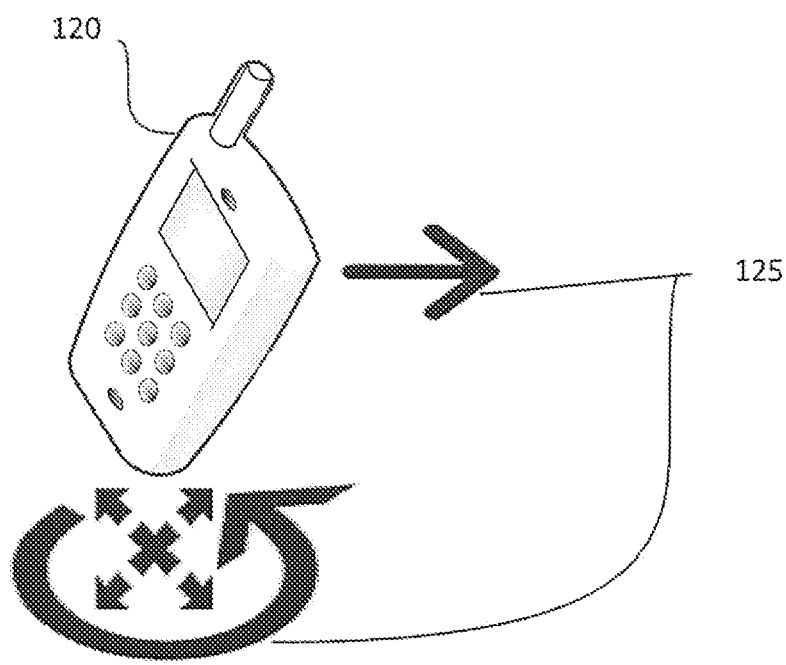
FIG. 2 illustrates the animation components within the system according to one embodiment of the invention.

FIG. 2 illustrates the animation components 125 within the system 100 according to one embodiment of the invention. The animation components 125 move the object 120. The animation components 125 illustrated are a lateral side movement, an increase in size movement, and a turntable rotation movement. The animation components 125 have a start time and an end time. Alternatively, the animation components 125 can be viewed as having a start time and a duration time, such that the end time can be calculated simply. In an animation timeline, each animation component 125 can be moved freely to specify when the animation should take place. The animation components 125 can be combined together or occur separately.

Figure 3:
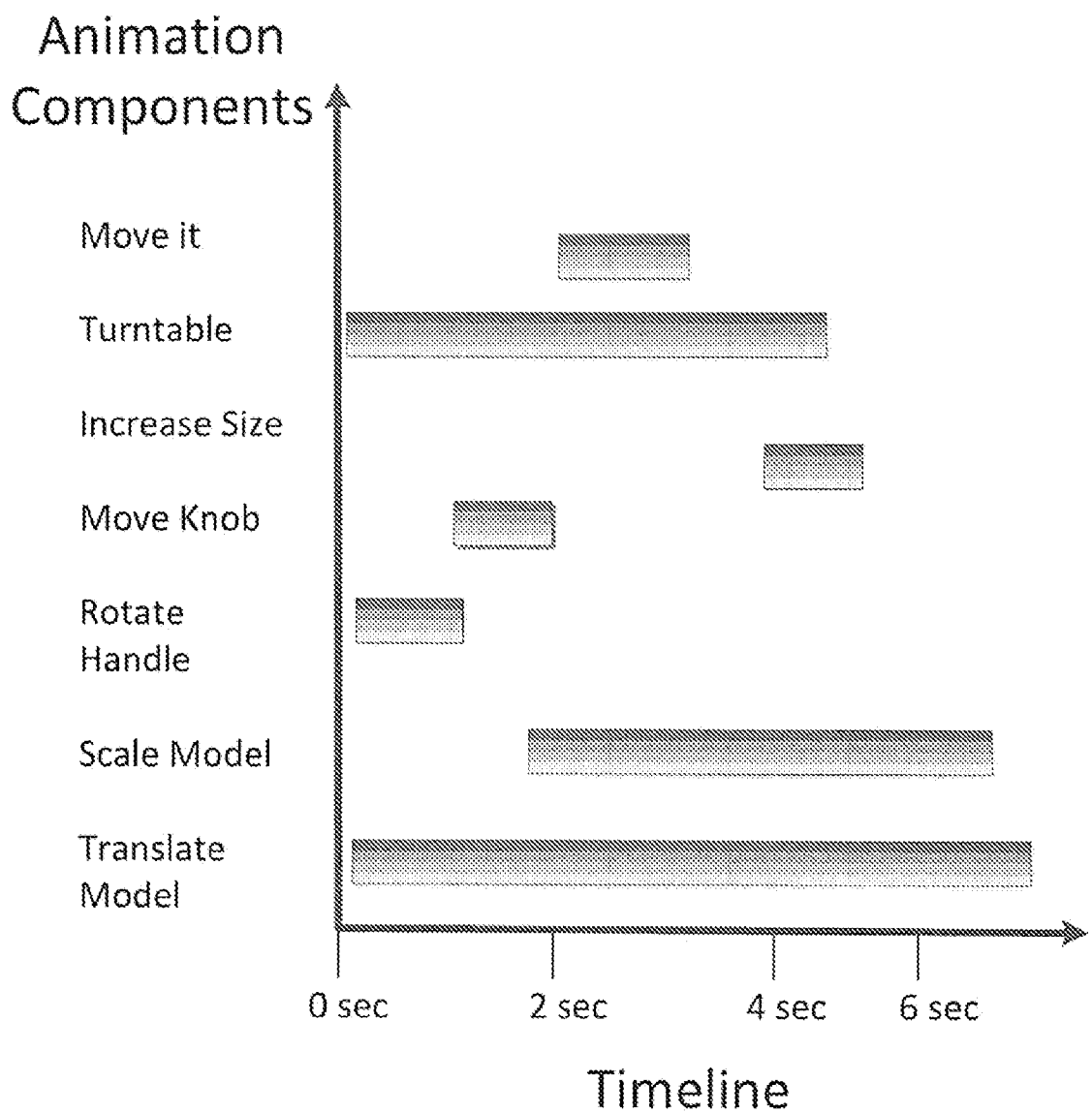
FIG. 3 illustrates an animation timeline according to one embodiment of the invention.

FIG. 3 illustrates an animation timeline according to one embodiment of the invention. The animation timeline (e.g., timeline window) includes animation components that are activated during a specified period of time for a particular object. The timeline in the horizontal-axis controls the timing of the individual animation components. The timeline highlights that the movements of animation components can be created and edited relative to time (e.g., in seconds), as opposed to the conventional method occurring between specific frames.

The animation components illustrated include more than just the three animation components 125 illustrated previously. For a particular object, the illustrated animation components can include move it, turntable, increase size, move knob, rotate handle, scale model, and translate model, etc. The system has a library containing many more possible animation components, although less than all of the library's animation components are typically applied to any given object. Each animation component is illustrated as starting at a particular time, ending at a particular time, and having a given duration time. For example, the "move it" animation component begins at two seconds and ends at three seconds, having a duration time of one second. Although this timeline is illustrated in terms of a whole number of seconds, the time can be more or less precise (e.g., 0.1 second, 0.5 seconds, 1 second, 2 seconds, 10 seconds, etc.). The number of seconds can be set by the user 105.

The timeline illustrates when each animation component is accessed and applied. The start time, end time, and duration can easily and freely be modified based on the preferences of the user 105. In one embodiment, the modification occurs by moving a slider (not shown) within the timeline. For example, the "move it" animation component can be extended from one second in duration to four seconds in duration by the user selecting and dragging the end time from three second to six seconds. Animation components can also be easily added, hidden, or deleted. The animation components can overlap or occur separately. For example, the "move it" and "turntable" animation components are illustrated as overlapping for a one second period of time, whereas the "increase size" and "move knob" animation components are illustrated as occurring separately.

While the animation is playing, it is possible to move the camera, change materials, and add new animations. The individual animation components 125 can also be modified during playback to directly see the effect of the parameter changes. Animations can also be hidden or deleted during playback. It is also possible to freeze (e.g., pause) the animation at a given time and view the object in a specific pose.

Figure 4:
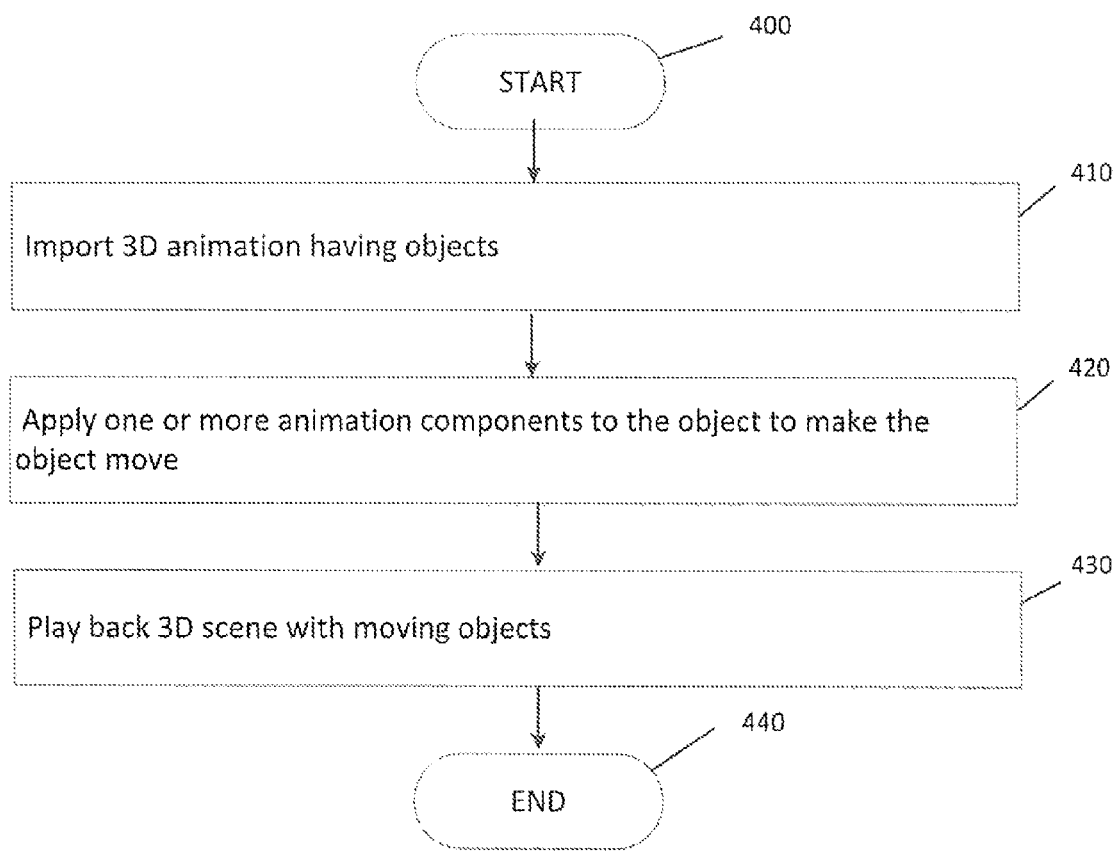
FIG. 4 illustrates a flow chart showing a process of applying animation components to a 3D scene according to one embodiment of the invention.

FIG. 4 illustrates a flow chart showing a process of applying animation components 125 to the 3D animation 115 according to one embodiment of the invention. The process starts at step 400. At step 410, the user 105 imports the 3D animation 115 having objects 120. The imported 3D animation 115 may have been created by the user 105 or another user 140. Next, at step 420, the user 105 applies one or more animation components 125 to the objects 120 to make the objects 120 move or change the look of the objects 120. Examples of movements include rotations, translations, scaling, turntables, camera orbits, camera dolly, camera zooms, material parameter changes, lighting changes, and freeform transformations. The user 105 then plays back the 3D model (e.g., scene) with the moving objects 115 at step 430. The 3D animation is augmented with the animation components 125 such that the objects 120 are animated. The process ends at step 440.

As an example to illustrate the calculations performed using the offset animation system according to one embodiment of the invention, an object is moved 1 unit to the left along the x-axis. While the object is being moved, it is also being scaled by 2 (i.e., doubled in size). The user selects the time 0 to 1 second for these actions. Then, at 1 second, the user decides to move the object back to the right by 1 unit along the x-axis for 1 second. The user selects the time 1 to 2 seconds for this action. The calculation of the transformation matrix acting upon the object for these actions is as follows.

From 0 to 1 seconds: TF=[S*t]*[TL*t], where TF is a transformation matrix, S is a scale matrix, t is time, and TL is a translation matrix, for the timeframe 0 to 1 second. The time (t) is a scalar value going from 0 to 1. The scale matrix (S) can be a 4×4 matrix, containing the value 2 along the diagonal and 0 elsewhere to represent the object doubling in size. The translation matrix (TL) can be a 4×4 matrix, containing 1 along the diagonal and 0 elsewhere except for the last row, which contains (1 0 0 1), to represent moving the object 1 unit to the left along the x-axis.

From 1 to 2 seconds: TF=S*TL*[TR*(t−1)], where TL and S are the transformation matrices previously used from 0 to 1 seconds, and TR is a translation matrix, for the timeframe 1 to 2 seconds. The time (t) is a scalar value going from 1 to 2. The translation matrix (TR) can be a 4×4 matrix and represents the moving the object 1 unit to the right along the x-axis. The translation matrix (TR) contains 1 along the diagonal and 0 elsewhere except for the last row, which contains (−1 0 0 1).

Note that the transformation matrix which is acting upon the object still contains the actions from previous transformations (e.g., S*TL). The new translation matrix (TR), from 1 to 2 seconds, simply acts as an offset to the previous transformation (TF) from 0 to 1 seconds.

It is to be recognized that depending on the embodiment, certain acts or events of any of the methods described herein can be performed in a different sequence, may be added, merged, or left out altogether (for example, not all described acts or events are necessary for the practice of the method). Moreover, in certain embodiments, acts or events may be performed concurrently, for example, through multi-threaded processing, interrupt processing, or multiple processors, rather than sequentially.

The steps of a method or algorithm described in connection with the embodiments disclosed herein may be embodied directly in a computer or electronic storage, in hardware, in a software module executed by a processor, or in a combination thereof. A software module may reside in a computer storage such as in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

It should be understood that the invention is not limited to the embodiments set forth herein for purposes of exemplification, but is to be defined only by a fair reading of the appended claims, including the full range of equivalency to which each element thereof is entitled. Although the invention has been described with reference to the above examples, it will be understood that modifications and variations are encompassed within the spirit and scope of the invention. Accordingly, the invention is limited only by the following claims.

What is claimed is:

1. A system comprising:
   a terminal;
   a three-dimensional model configured to be displayed on the terminal;
   an object in the three-dimensional model; and
   an animation component configured to be applied to the object to move the object or to change the look of the object, wherein the animation component has a start time and an end time defined in increments of time, wherein the animation component creates an animation, wherein the animation component comprises a transformation that can be combined or offset by another animation component.

2. The system of claim 1, wherein the terminal comprises a television or computer.

3. The system of claim 1, wherein the three-dimensional model comprises a scene configured to be displayed on the terminal.

4. The system of claim 3, wherein the object comprises an element in the scene.

5. The system of claim 1, wherein the animation component comprises an offset transform.

6. The system of claim 1, wherein the animation component comprises a translation movement, a rotation movement, a scaling movement, a turntable movement, a camera orbit movement, a camera pan movement, a camera dolly movement, a camera zoom movement, a material parameter change, a lighting parameter change, or a time varying movement specified by a matrix at given time instances.

7. The system of claim 1, further comprising a timeline for adjusting the start time and the end time.

8. The system of claim 1, further comprising interactive ray tracing.

9. The system of claim 8, wherein the three-dimensional model is created and played back using the interactive ray tracing.

10. The system of claim 1, wherein the animation component and the object are configured to be evaluated at a given time.

11. The system of claim 1, further comprising multiple animation components, wherein the animation components are organized hierarchically with animation components higher up in the hierarchy acting upon animation components lower in the hierarchy.

12. The system of claim 1, wherein the animation component is configured to be hidden or deleted.

13. The system of claim 1, wherein the animation component is configured to be copied and pasted to other objects.

14. The system of claim 1, wherein the animation component is configured to be changed by a user during playback of the three-dimensional model or while paused.

15. The system of claim 1, further comprising a library of animation components that can be added to the object.

16. A method comprising:
   displaying a three-dimensional model on a terminal, wherein the three-dimensional model comprises an object; and
   applying an animation component to the object to move the object or to change the look of the object, wherein the animation component has a start time and an end time defined in increments of time.

17. The method of claim 16, wherein the three-dimensional model comprises a scene configured to be displayed on a television or computer.

18. The method of claim 16, wherein the animation component comprises an offset transform.

19. The method of claim 16, wherein the animation component comprises a translation movement, a rotation movement, a scaling movement, a turntable movement, a camera orbit movement, a camera pan movement, a camera dolly movement, a camera zoom movement, a material parameter change, a lighting parameter change, or a time varying movement specified by a matrix at given time instances.

20. The method of claim 16, further comprising a timeline for adjusting the start time and the end time.

* * * * *